(12) United States Patent
Lyons

(10) Patent No.: US 6,536,378 B2
(45) Date of Patent: Mar. 25, 2003

(54) APPARATUS FOR EVACUATING CONDENSATION FROM FURNACE PIPE SYSTEMS

(75) Inventor: Leslie Alan Lyons, Cassville, MO (US)

(73) Assignee: Fasco Industries, Inc., Cassville, MO (US)

( * ) Notice: Subject to any disclaimer, the term of this patent is extended or adjusted under 35 U.S.C. 154(b) by 50 days.

(21) Appl. No.: 09/756,813

(22) Filed: Jan. 9, 2001

(65) Prior Publication Data

US 2002/0115036 A1 Aug. 22, 2002

Related U.S. Application Data

(60) Provisional application No. 60/175,522, filed on Jan. 11, 2000.

(51) Int. Cl.[7] ............................................. F16L 21/00
(52) U.S. Cl. ............................ 122/20 B; 126/110 R; 285/236
(58) Field of Search ............................ 122/235.15, 360, 122/361, 20 B; 126/110 A, 106, 108, 104 A, 110 R; 432/210, 211; 285/236

(56) References Cited

U.S. PATENT DOCUMENTS

| | | | | |
|---|---|---|---|---|
| 4,899,726 A | | 2/1990 | Waterman | 126/110 |
| 4,995,375 A | * | 2/1991 | Jackson | 126/85 B |
| 5,341,795 A | | 8/1994 | Chou et al. | 126/110 |
| 5,379,751 A | * | 1/1995 | Larsen et al. | 126/110 R |
| 5,547,232 A | * | 8/1996 | Waterman | 285/236 |

OTHER PUBLICATIONS

"Condensation Collector Part No. SKC–5081 M", admitted prior art.

* cited by examiner

*Primary Examiner*—Gregory Wilson
(74) *Attorney, Agent, or Firm*—Andrus, Sceales, Starke & Sawall, LLP

(57) ABSTRACT

An apparatus for evacuating liquid condensation from pipe systems which is particularly applicable to exhaust pipe systems in high efficiency furnaces. The apparatus forms a junction sleeve between two pipes and has drainage channels which prevent condensate liquid from flowing from one pipe into the other pipe. A thermoplastic rubber composition of the apparatus dampens noise and vibration in the pipe system. External grooves provide locating features for mounting clamps.

20 Claims, 3 Drawing Sheets

SECTION A_A

APPARATUS FOR EVACUATING CONDENSATION FROM FURNACE PIPE SYSTEMS

CROSS-REFERENCES TO RELATED APPLICATIONS

This application is based on and claims priority to U.S. Provisional Application No. 60/175,522, filed on Jan. 11, 2000.

STATEMENT REGARDING FEDERALLY SPONSORED RESEARCH OR DEVELOPMENT

Not Applicable

BACKGROUND OF THE INVENTION

The present invention relates to pipe systems and more particularly to furnace pipe systems and more particularly to liquid evacuation devices for furnace pipe systems.

Drainage of water condensation from furnace exhaust pipes in typical heating systems accumulates in undesirable areas and causes deterioration or damage to heating system components. Water condenses from the atmosphere onto the exhaust pipe walls because the hot gasses which travel in the exhaust pipe contact the exhaust pipe walls which are often much cooler. The difference between the temperature of the hot gasses and the temperature of the exhaust pipe walls causes water condensation to form on the exhaust pipe walls because the quantity of water vapor which may be contained in a volume gas decreases as the gas temperature decreases. When the temperature of a gas is decreased by contact with a cooler surface the gas may become saturated with water vapor so that water will condense out of the gas and onto the cool surface as liquid. Water condensation typically drains along the exhaust pipe walls and accumulates in pools on any horizontal surface. It is desirable to prevent such accumulation of water and thereby extend the useful live of heating system components.

U.S. Pat. No. 5,620,302 teaches that drainage holes which are provided in a furnace blower housing allow water to drain out of a furnace blower. However, drainage holes in a blower housing do not prevent water from first entering the blower. The presence of water within the blower may cause deterioration or damage to blower components before the water eventually flows through the blower drainage holes.

SUMMARY OF THE INVENTION

Accordingly, the invention described and claimed herein relates to a sleeve which provides a junction between a furnace blower pipe and a heating system pipe and which provides means for water condensation drainage away from a furnace blower. The sleeve comprises two generally concentric cylinders, an outer cylinder and an inner cylinder, which are joined by an annular wall. A blower pipe cavity which is formed between the two cylinders on one side of the annular wall is sized to mate with an end of a blower pipe. An exhaust pipe cavity which is formed between the two cylinders on an opposite side of the annular wall is sized to fit an end of a heating system exhaust pipe. The exhaust pipe cavity also serves as a condensate reservoir. At least one protrusion from the annular wall or the outside cylinder into the exhaust pipe cavity forms a pipe-stop which prevents the exhaust pipe from abutting the annular wall thereby providing a space between the annular wall and the exhaust pipe for water condensate to flow. At least one hole through the outer cylinder and into the exhaust pipe cavity provides a condensate exit port from the exhaust pipe cavity. It is a primary advantage of the invention to provide means to drain water from the inner exhaust pipe walls away from the blower and thereby prevent or significantly reduce the flow of water into a furnace blower.

It is a further primary advantage of the invention to provide a drainage outlet for water condensation that does not interfere with the operation of a furnace blower. It is still another primary advantage of the invention to provide a condensate evacuation apparatus which is adapted for use on horizontally, vertically or diagonally mounted pipe systems.

Those skilled in the art will recognize that the invention is not limited to furnace pipe applications. The apparatus of the invention may be used to evacuate water condensation from a pipe at any number of similar pipe junctions. It is an advantage of the invention to provide a condensation drainage apparatus that can accommodate a wide variety of pipe sizes. These and other objects of the invention will be made apparent in the drawings and in the following detailed description of the invention.

DETAILED DESCRIPTION OF THE INVENTION

Figure 1:
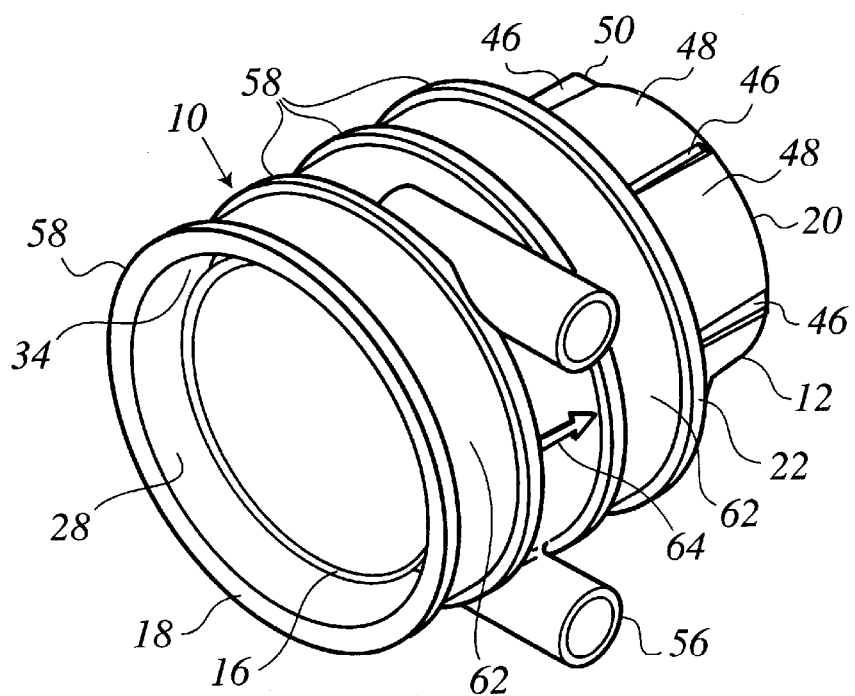
FIG. 1 is a bottom perspective view of an exhaust drain sleeve in accordance with one embodiment of the invention.
Figure 2:
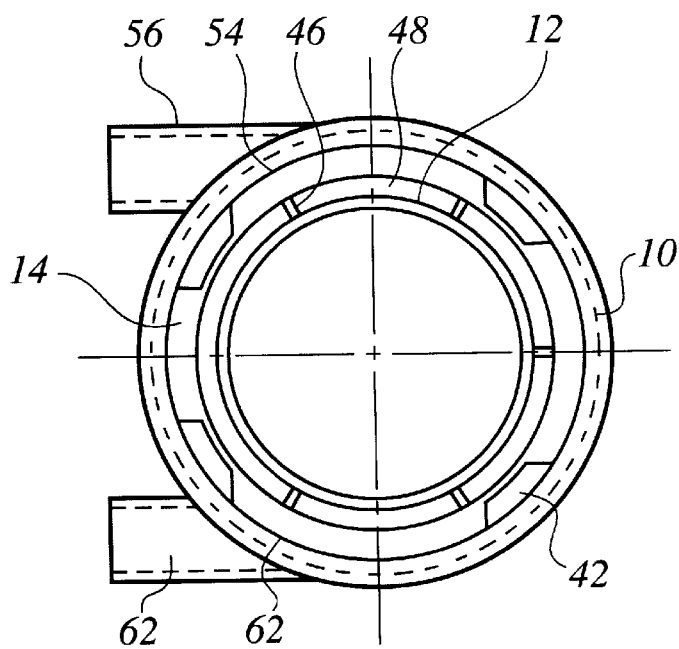
FIG. 2 is a top view of an exhaust drain sleeve in accordance with one embodiment of the invention.
Figure 3:
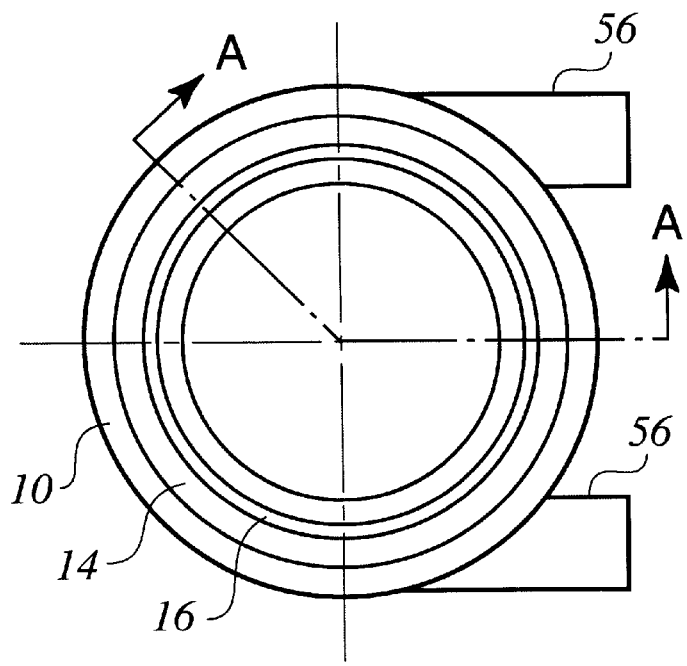
FIG. 3 is a bottom view of an exhaust drain sleeve in accordance with one embodiment of the invention.
Figure 4:
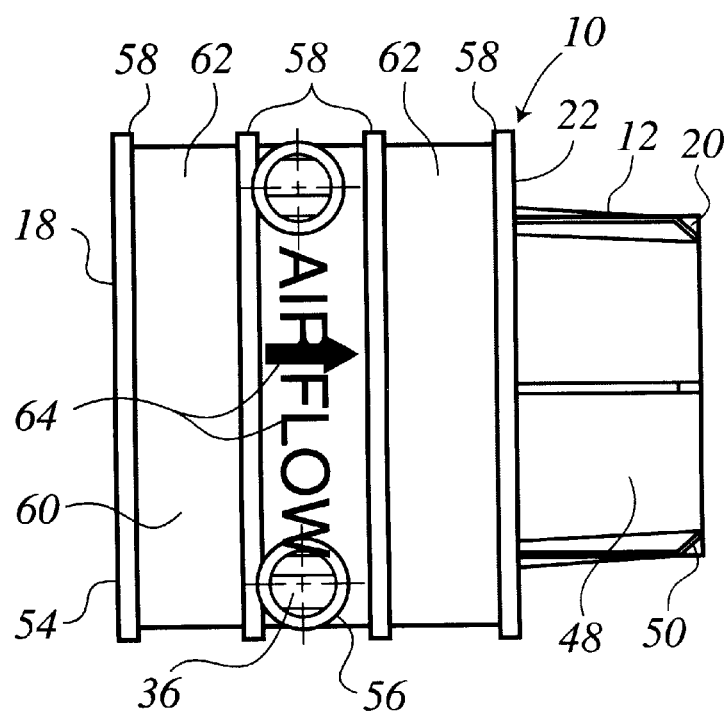
FIG. 4. is a side view of an exhaust drain sleeve in accordance with one embodiment of the invention.
Figure 5:
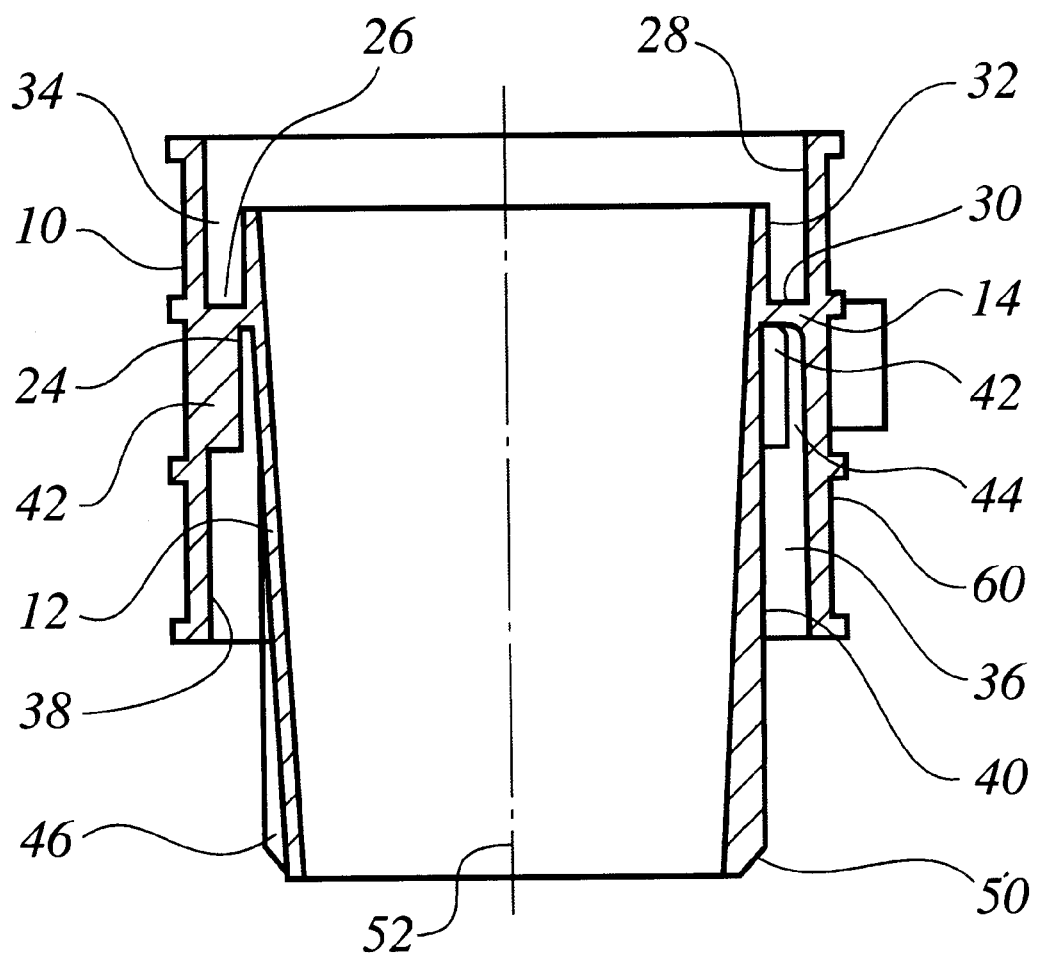
FIG. 5. is a side sectional view of an exhaust drain sleeve in accordance with one embodiment of the invention.

In one embodiment, the invention comprises an outer cylinder 10 concentric to an inner cylinder 12. The inner cylinder 12 is attached to the outer cylinder 10 by an annular wall 14. Each cylinder 10, 12 has a blower end 16, 18 and an exhaust end 20, 22. The inner cylinder 12 is tapered so that it becomes narrower toward its exhaust end 20. Thus the inner cylinder 20 is not really a cylindrical but rather frusto-conical in shape. The exhaust end 20 of the inner cylinder 12 protrudes from the exhaust end 22 of the outer cylinder 10. Conversely, the blower end 18 of the outer cylinder 10 extends over the blower end 16 of the inner cylinder 12. In a preferred embodiment, the annular wall 14 is proximate to the blower ends 16, 18 of the inner and outer cylinders 10, 12.

A blower pipe cavity 34 is formed by an inner surface 28 of the blower end 18 of the outer cylinder 10, the blower side 30 of the annular wall 14 and an outer surface 32 of the blower end 16 of the inner cylinder 12. The blower pipe cavity 34 is sized to mate with a blower pipe (not shown) so that the inner cylinder 12 fits inside the blower pipe, the outer cylinder 10 fits outside the blower pipe and the annular wall 14 abuts the blower pipe.

An exhaust pipe cavity 36 is formed by an inner surface 38 of the exhaust end 22 of the outer cylinder 10, the exhaust side 26 of the annular wall 14 and an outer surface 40 of the exhaust end 20 of the inner cylinder 12. The exhaust pipe cavity 36 is sized to mate with an exhaust pipe (not shown) so that the outer cylinder 10 fits outside the exhaust pipe.

At least one boss 42 is provided in the exhaust pipe cavity to prevent the exhaust pipe from abutting the exhaust side 26 of the annular wall 14. The space thus provided between an end of an exhaust pipe and the annular wall 14 is an essential space to provide for the flow of condensate water. In a preferred embodiment, four about equally spaced bosses 42 protrude from an intersection of an exhaust side 26 of the annular wall 14 and the inner surface 38 of the exhaust end 22 of the outer cylinder 10.

The invention provides a plurality, preferably six, of evenly spaced ribs 46 which protrude from the outside surface 40 of the exhaust end 20 of the inner cylinder 12. The ribs 50 are oriented generally parallel to the axis 52 of the outer and inner cylinders 10, 12 and are tapered counter to the taper of the inner cylinder 12 so that rib height decreases toward the annular wall 14. A short opposite taper 50 of the ribs 46 at the exhaust end 20 of the inner cylinder provides a lead-in shape to allow easy installation of an exhaust pipe. The ribs 46 provide a space 48 between the outer surface 40 of the exhaust end 20 of the inner cylinder 12. The space 48 between the ribs 46 thus provides for the drainage of condensate water along the exhaust pipe toward the annular wall 14. As illustrated, the ribs 46 do not completely obstruct an axial space adjacent to the exhaust side 26 if the annular wall 14 because that space is necessary to provide a condensate drainage path.

At least one drain hole 54 is provided through the outer cylinder 10 into the exhaust pipe cavity 36 proximate to the intersection between the outer cylinder 10 and the exhaust side 26 of the annular wall 14. The at least one hole 54 provides a space for condensate water to flow out of the exhaust pipe cavity 36. In a preferred embodiment, two drain holes 54 are provided and are located as mirror images of each other relative to a plane which bisects the cylinders 10, 12 through their central axis 52. The apparatus may thereby be oriented to function as a condensate drain for horizontally, vertically or diagonally mounted pipe systems.

In a preferred embodiment, drain tubes 56 protrude from the outer cylinder 10 so that the drain tube walls surround the drain holes 54 thereby providing drain channels away from the blower pipe.

In a preferred embodiment of the invention, four annular rings 58 protrude from an outside surface 60 of the outer cylinder to form two clamp grooves 62 whereby one grove is proximate to each end 18, 22 of the outer cylinder 10. The clamp groves 62 provide for installation of clamping devices so that the clamping devices will not migrate along the outside surface 60 of the outer cylinder 10 in response to system vibrations or other disturbances. Clamping devices are typically used to secure a junction apparatus to a pipe.

A preferred embodiment of the invention is a molded of thermoplastic rubber material so that the invention provides a resilient mount between a furnace blower and a heating system exhaust pipe. The use of thermoplastic rubber material also dampens noise and vibration of the heating system. A preferred material is a thermoplastic rubber that is known in the art to be used in 90+ furnace applications.

In a preferred embodiment graphic symbols or text 64 are molded into the outer surface 60 of the outer cylinder 10 to indicate the proper orientation for installation of the invention.

I claim:

1. An apparatus for evacuating condensate water from a pipe comprising:
    an inner cylinder concentrically affixed to an outer cylinder by an annular wall disposed between said inner cylinder and said outer cylinder wherein said annular wall divides the space between said inner cylinder and said outer cylinder into an input side pipe groove and an output side pipe groove;
    further comprising
        an inside diameter of an input end of said outer cylinder which is about slightly greater than an outside diameter of a mating input pipe;
        an inside diameter of an output end of said outside cylinder which is about slightly greater than an outside diameter of a mating output pipe;
        an outside diameter of an input end of said inside cylinder which is about slightly less than an inside diameter of the mating input pipe;
        a plurality of ribs protruding from an outside surface of said inner cylinder and extending generally parallel to a central axis of said inner cylinder and said outer cylinder wherein said plurality of ribs are sized to provide an interference fit with an inside surface of an output pipe and wherein said ribs leave an annular space adjacent to an output facing side of said annular wall;
        at least one boss protruding into said output side pipe groove wherein said at least one boss forms a pipe-stop which prevents an output side pipe from abutting said annular wall;
        and at least one edge defining a drain hole passing through said outside cylinder and into said output pipe groove proximate to said annular wall.

2. The apparatus according to claim 1 wherein said inside cylinder protrudes from an output end of said outside cylinder,
    wherein an input end of said outside cylinder extends over an input end of said inside cylinder
    and wherein said inside cylinder is frusto-conical having an narrower end toward an output end of said inside cylinder.

3. The apparatus according to claim 2 wherein said input side pipe groove is adapted to fit a furnace blower pipe
    and wherein said output pipe groove is adapted to fit a heating system exhaust pipe.

4. The apparatus according to claim 1, further comprising a drain tube surrounding each of said at least one edges defining a drain hole wherein said drain tube protrudes from said outside cylinder.

5. The apparatus according to claim 4 wherein said apparatus is formed of a thermoplastic rubber material.

6. The apparatus according to claim 5 having two drain holes and two drain tubes wherein said two drain holes and said two drain tubes are located as mirror images of each other relative to a plane through a central axis of said outside cylinder and said inside cylinder.

7. The apparatus according to claim 5 further comprising four annular rings protruding from an outside surface of said outside cylinder and defining two clamp grooves wherein one clamp groove is disposed in proximity to each of two ends of said apparatus.

8. The apparatus according to any one of claims 5 having six of said ribs which are equally spaced.

9. The apparatus according to any one of claims 5 having four of said bosses which are about equally spaced.

10. The apparatus according to claim 5 further comprising at least one graphic symbol incorporated visably into an outside surface of said apparatus wherein said at least one graphic symbol indicates an orientation for correct installation of said apparatus.

11. The apparatus according to claim 5 wherein said thermoplastic rubber material is a type of thermoplastic rubber material which is known to be suitable for use in 90+ furnace systems.

12. An apparatus for evacuating condensate water from an exhaust pipe coupled to a heating system blower, the apparatus comprising:
   an inner cylinder extending between a blower end and an exhaust end, the inner cylinder including an outer surface having an outer diameter slightly less than an inside diameter of the exhaust pipe, such that the exhaust pipe is receivable along the outer surface of the inner cylinder;
   an outer cylinder coaxial with the inner cylinder and positioned to surround at least a portion of the inner cylinder, the outer cylinder being affixed to the inner cylinder by an annular wall, wherein the annular wall extends between the outer surface of the inner cylinder and an inner surface of the outer cylinder to form an exhaust pipe cavity between the outer cylinder and the inner cylinder, wherein the length of the inner cylinder from the annular wall to the exhaust end prevents condensate water accumulated in the exhaust cavity from entering into the exhaust pipe;
   at least one boss protruding into the exhaust pipe cavity adjacent to the annular wall to form a pipe-stop, wherein the pipe-stop prevents the exhaust pipe from abutting the annular wall; and
   at least one drain hole extending through the outer cylinder and into the exhaust pipe cavity adjacent to the annular wall, wherein The drain hole allows condensate water accumulated in the exhaust pipe cavity to drain from the exhaust pipe cavity.

13. The apparatus of claim 12 wherein the boss extends radially inward from the inner surface of the outer cylinder and is joined to the annular wall.

14. The apparatus of claim 12 wherein the exhaust end of the inner cylinder extends axially past an exhaust end of the outer cylinder.

15. The apparatus of claim 12 wherein the inner cylinder is frustoconical and decreases in diameter from the blower end to the exhaust end.

16. The apparatus of claim 15 further comprising a plurality of ribs protruding from the outer surface of the inner cylinder, wherein the ribs extend generally parallel to a central axis of the inner cylinder to provide an interference fit with the exhaust pipe, wherein the ribs create an annular space between the exhaust pipe and the outer surface of the inner cylinder.

17. The apparatus of claim 12 further comprising a drain tube surrounding each of the drain holes, wherein the drain tube protrudes from the outer cylinder.

18. The apparatus of claim 17 wherein two drain holes extend through the outer cylinder and into the exhaust pipe cavity, wherein the drain holes are located as mirror images of each other relative to a plane through a central axis of the outer cylinder and the inner cylinder.

19. The apparatus of claim 12 further comprising at least two annular rings protruding from an outer surface of the outer cylinder to define a clamp groove therebetween, wherein the clamp groove is disposed proximate to an exhaust end of the outer cylinder.

20. The apparatus of claim 12 wherein the blower end of the inner cylinder is flush with the annular wall.

* * * * *